United States Patent [19]

Gaeng et al.

[11] 3,715,360
[45] Feb. 6, 1973

[54] DYES OF THE 2,4-DIHYDROXYQUINOLINE SERIES

[75] Inventors: Manfred Gaeng, Bobenheim-Roxheim; Peter Dimroth, Ludwigshafen, both of Germany

[73] Assignee: Badische Anilin- & Soda-Fabrik Aktiengesellschaft, Ludwigshafen/Rhine, Germany

[22] Filed: Feb. 19, 1971

[21] Appl. No.: 117,086

[30] Foreign Application Priority Data

Feb. 25, 1970 Germany..........P 20 08 676.4

[52] U.S. Cl.............260/288 R, 106/22, 106/288 Q, 260/154, 260/155, 260/256.4 R, 260/289 R
[51] Int. Cl..............................................C07d 33/50
[58] Field of Search...........................260/288 R, 155

[56] References Cited

UNITED STATES PATENTS

| | | | |
|---|---|---|---|
| 2,029,647 | 2/1936 | Wizinger | 260/155 |
| 2,231,705 | 2/1941 | Dickey | 260/155 |
| 2,993,884 | 7/1961 | Ruegg | 260/155 |

*Primary Examiner*—Donald G. Daus
*Attorney*—Johnston, Root, O'Keeffe, Keil, Thompson & Shurtleff

[57] ABSTRACT

New dyes having the formula:

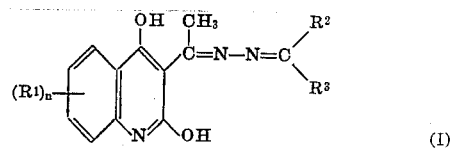

in which $R^1$ denotes a hydrogen atom, a halogen atom or a nitro group, $n$ denotes the integer 1 or 2, $R^2$ denotes a hydrogen atom, an unsubstituted or substituted alkyl group having one to three carbon atoms, an aromatic radical or, together with

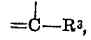

denotes a five-membered or six-membered carbocyclic or heterocyclic ring which may contain substituents and condensed rings, and $R^3$ may also denote an unsubstituted or substituted alkyl group having one to three carbon atoms or an aliphatic, aromatic or heterocyclic radical which may be attached by way of —CO—.

The dyes are pigment dyes.

7 Claims, No Drawings

DYES OF THE 2,4-DIHYDROXYQUINOLINE SERIES

The invention relates to new dyes of the 2,4-dihydroxyquinoline series. The dyes have the formula:

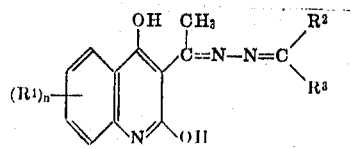

(I)

in which $R^1$ denotes a hydrogen atom, a halogen atom or a nitro group, $n$ denotes the integer 1 or 2, $R^2$ denotes a hydrogen atom, an unsubstituted or substituted alkyl group having one to three carbon atoms, an aromatic radical, or together with

denotes a five-membered or six-membered carbocyclic or heterocyclic ring which may contain substituents and condensed rings, and $R^3$ may also denote an unsubstituted or substituted alkyl group having one to three carbon atoms or an aliphatic, aromatic or heterocyclic radical which may be attached by way of —CO—.

Because of the insolubility of the new dyes in water and organic solvents and because of their good fastness properties and high brilliance, they are outstandingly suitable as pigment dyes.

In the new dyes having the formula (I), the halogen atom denoted by $R^1$ may be a chlorine or bromine atom. Examples of unsubstituted or substituted alkyl groups having one to three carbon atoms are:

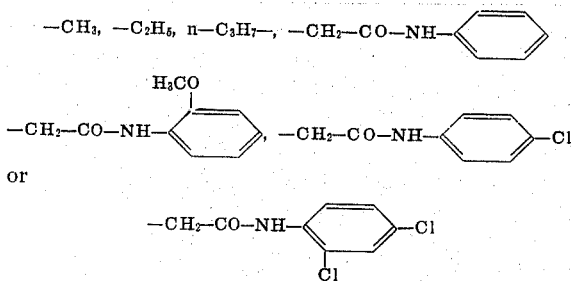

Examples of aromatic radicals are aryl radicals such as phenyl or naphthyl radicals which may bear hydroxy groups, halogen atoms such as chlorine or bromine atoms, or methoxy groups as substituents. Examples of heterocyclic radicals are pyrazole groups, pyridone groups or pyrimidone groups.

Examples of five-membered or six-membered carbocyclic or heterocyclic rings having the formula

which the dyes having the formula (I) may contain are the members:

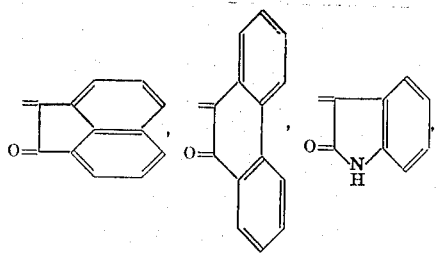

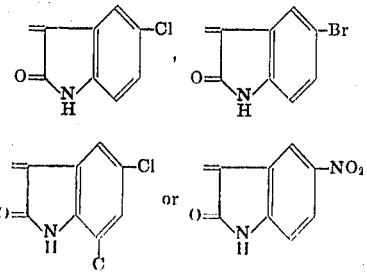

Of the new dyes, those dyes having the formula (II):

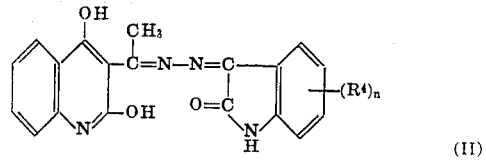

(II)

in which $R^4$ denotes a hydrogen, chlorine or bromine atom and $n$ denotes the integer 1 or 2 are of particular industrial interest.

The new dyes may be prepared for example by reacting in an organic solvent a hydrazone having the formula (III):

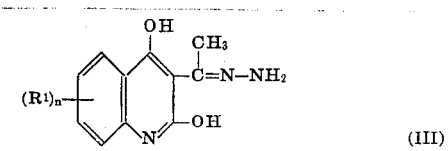

(III)

in which $R^1$ and $n$ have the above meanings with a compound having the formula (IV):

(IV)

in which $R^2$ and $R^3$ have the above meanings. Examples of suitable organic solvents are ethanol, n-propanol, isopropanol, n-butanol, isobutanol, glycol monomethyl ether, glycol monoethyl ether, glycol monobutyl ether, propylene glycol, propionic acid, ethylene glycol, glacial acetic acid or mixtures of these solvents. The reaction is preferably carried out within the temperature range from 70° to 130° C.

According to a particularly advantageous embodiment of the manufacturing process, the dyes according to the invention may be obtained in a single vessel by first preparing the hydrazone having the formula (III) in the said solvents from the appropriate 3-acetyl- 2,4-dihydroxyquinoline and hydrazine hydrate at a temperature of from 40° to 70° C and then carrying out the reaction with the compound having the formula (IV) (without isolating the hydrazone) at a temperature of from 70° to 130° C, preferably from 100° to 120° C.

Examples of starting materials having the formula (III) are the hydrazones of 3-acetyl-2,4-dihydroxyquinoline, 6,8-dichloro-3-acetyl-2,4-dihydroxyquinoline and 6-nitro-3-acetyl-2,4-dihydroxyquinoline.

Examples of starting materials having the formula (IV) are ketones such as acetone or benzophenone; acetoacetic acid arylides such as the anilide, o-chloroanilide or p-methoxyanilide of acetoacetic acid; $\alpha, \beta$-diketones such as diacetyl, benzil, acenaphthenequinone or phenanthrenequinone; unsubstituted or substituted isatins such as isatin, 5-chloroisatin, 5,7-dichlorolsatin, 5-bromoisatin or 5-nitroisatin; aromatic or heterocyclic aldehydes such as benzaldehyde, terephthalaldehyde, salicylaldehyde, β-hydroxynaphthaldehyde or 1-phenyl-3-methyl-5-hydroxypyrazolealdehyde.

The new dyes are yellow to red pigments which have good fastness properties and may be used for all purposes of the pigment industry. Particularly when used in printing inks and varnish colors and in the mass coloration of polyvinyl chloride and especially of polystyrene they are distinguished by good brilliance and high fastness to light.

The following Examples illustrate the invention.

The parts specified in the Examples are parts by weight.

EXAMPLE 1

21.7 parts of the hydrazone of 3-acetyl-2,4-dihydroxyquinoline and 12.2 parts of salicylaldehyde in 700 parts of glacial acetic acid are boiled under reflux for 3 hours. The reaction mixture is then suction filtered at room temperature and the residue is washed with glacial acetic acid and water and dried. 27.4 parts of a yellow pigment having the formula:

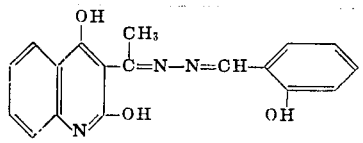

is obtained having a melting point of 325° C.

EXAMPLE 2

The 12.2 parts of salicylaldehyde in Example 1 is replaced by 17.2 parts of β-hydroxynaphthaldehyde. 37 parts of a yellow pigment having the formula:

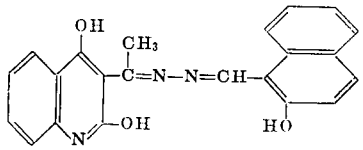

is obtained having a melting point of 349° C. The pigment exhibits a very good brilliance in coating compositions and has good color strength.

EXAMPLE 3

The 12.2 parts of salicylaldehyde in Example 1 is replaced by 20.2 parts of 1-phenyl-3-methyl-5-hydroxypyrazolaldehyde-(4). 36 parts of a yellow pigment having the formula:

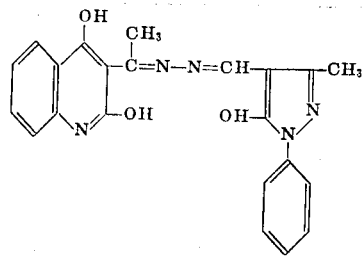

is obtained having a melting point of 305° to 307° C.

EXAMPLE 4

21.7 parts of the hydrazone of 3-acetyl-2,4-dihydroxyquinoline and 17.7 parts of acetoacetic anilide in 650 parts of glacial acetic acid are boiled under reflux for four hours. The reaction mixture is then suction filtered and the residue is washed with glacial acetic acid and water and dried. 15 parts of a greenish yellow pigment having the formula:

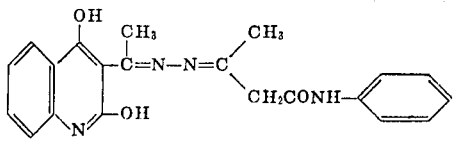

is obtained which in coating compositions has not only good color strength but also a very pure green yellow shade.

EXAMPLE 5

21.7 parts of the hydrazone of 3-acetyl-2,4-dihydroxyquinoline and 18.2 parts of benzophenone in 400 parts of glycol monomethyl ether are boiled for four hours under reflux. After suction filtration, washing and drying, 13 parts of a yellow pigment having the formula:

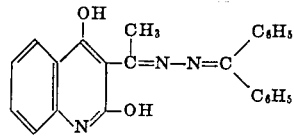

is obtained.

EXAMPLE 6

21.7 parts of the hydrazone of 3-acetyl-2,4-dihydroxyquinoline and 21 parts of benzil in 500 parts of glacial acetic acid are boiled under reflux for 3 hours. After suction filtration, washing and drying, 15 parts of a greenish yellow pigment having the formula:

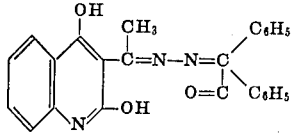

is obtained having a very pure shade both in coating compositions and in prints.

EXAMPLE 7

21.7 parts of the hydrazone of 3-acetyl-2,4-dihydroxyquinoline is reacted with 20.8 parts of phenanthrenequinone as described in Example 6.

20.2 parts of a red pigment is obtained having the formula:

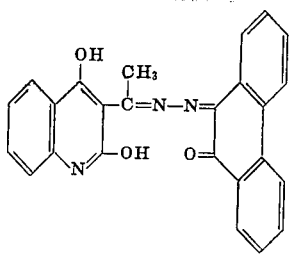

EXAMPLE 8

21.7 parts of the hydrazone of 3-acetyl-2,4-dihydroxyquinoline and 14.7 parts of isatin in 600 parts of glacial acetic acid are boiled under reflux for 5 hours. The reaction mixture is cooled to 50° C and suction filtered and the residue is washed with glacial acetic acid and water and dried. 32 parts of a reddish yellow pigment is obtained having the formula:

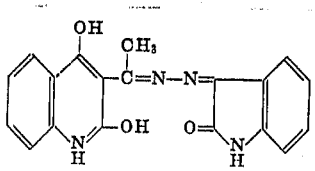

and having a melting point of 338° C. In coating compositions the pigment exhibits a brilliant reddish yellow shade having remarkably high transparency and very good color strength.

EXAMPLE 9

20 parts of the pigment described in Example 8 is obtained by boiling 20.3 parts of 3-acetyl-2,4-dihydroxyquinoline with 16.1 parts of isatin β-hydrazone and 8.5 parts of anhydrous sodium acetate in 400 parts of glacial acetic acid under reflux for 5 hours.

EXAMPLE 10

31.5 parts of the pigment described in Example 8 is obtained by boiling under reflux two hours 20.3 parts of 3-acetyl-2,4-dihydroxyquinoline with 5 parts of hydrazine hydrate in 200 parts of ethanol, then adding 14.7 parts of isatin and 200 parts of glacial acetic acid and heating the mixture under reflux for another three hours.

EXAMPLE 11

The 14.7 parts of isatin in Example 8 is replaced by 21.6 parts of 5,7-dichloroisatin. 40 parts of a reddish yellow pigment is obtained having the formula:

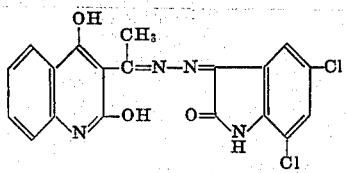

and having a melting point of 347° C.

EXAMPLE 12

The 21.7 parts of the hydrazone of 3-acetyl-2,4-dihydroxyquinoline in Example 8 is replaced by 27.2 parts of the hydrazone of 6,8-dichloro-3-acetyl-2,4-dihydroxyquinoline. 28 parts of a red pigment is obtained having the formula:

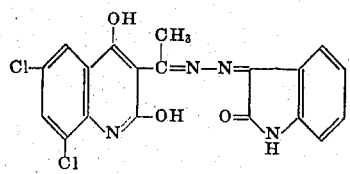

and having a melting point of 240° C.

EXAMPLE 13

The 21.7 parts of the hydrazone of 3-acetyl-2,4-dihydroxyquinoline in Example 8 is replaced by 26.2 parts of the hydrazone of 6-nitro-3-acetyl-2,4-dihydroxyquinoline. 31 parts of a red pigment is obtained having the formula:

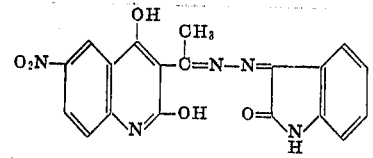

EXAMPLE 14

27 parts of the pigment described in Example 13 is obtained by heating 24.8 parts of 6-nitro-3-acetyl-2,4-dihydroxyquinoline with 5 parts of hydrazine hydrate in 200 parts of ethanol for two hours at 60° to 70° C, then adding 14.7 parts of isatin and 200 parts of glacial acetic acid and boiling under reflux for another three hours.

EXAMPLE 15

21.7 parts of the hydrazone of 3-acetyl-2,4-dihydroxyquinoline is heated under reflux for three hours with 5.8 parts of acetone in 300 parts of glycol monomethyl ether. The reaction mixture is suction filtered, and the residue is washed and dried. 23 parts of a yellow pigment is obtained having the formula:

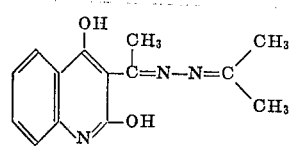

EXAMPLE 16

5 parts of the pigment obtained according to Example 8, 9 or 10 is ground in an attrition mill with 95 parts of acrylic resin coating composition (consisting of 80 parts of acrylic resin solution and 20 parts of melamine resin solution). An orange-colored coating composition having good color strength is obtained which after having been baked for 30 minutes at 130° C exhibits very good fastness to light and overspraying.

By diluting 2 parts of the said acrylic resin varnish with 20 parts of a white coating composition (consisting of 20 parts of titanium dioxide and 80 parts of acrylic resin coating composition), a reddish yellow coating composition having good depth of color is obtained which exhibits good fastness to light and overspraying after baking.

20 parts of the pigment obtained according to Example 1 is ground with 80 parts of book-printing or offset varnish in the conventional way on a three roll mill. The printing ink prepared in this way gives prints having excellent color strength, light fastness and brilliance when processed in book printing and offset printing. Printing inks having similar properties are obtained when pigments described in the other Examples are used.

We claim:

1. A dye having the formula

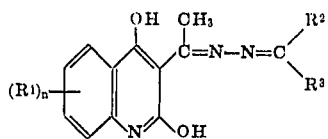

(I)

in which R¹ denotes hydrogen, halogen or nitro, n denotes the integer 1 or 2, R² denotes hydrogen or together with

the radical of the formula

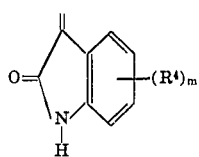

wherein R⁴ denotes chlorine, bromine or nitro with m being the integer 1 or 2, and R³ denotes 2-hydroxy phenyl or 2-hydroxy-naphthyl-(1) when R² is hydrogen.

2. A dye having the formula

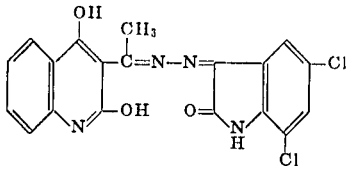

wherein R⁴ denotes hydrogen, chlorine or bromine and m denotes the integer 1 or 2.

3. A dye having the formula

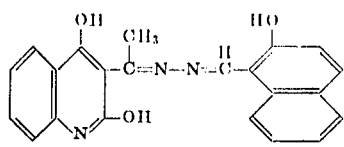

4. A dye having the formula

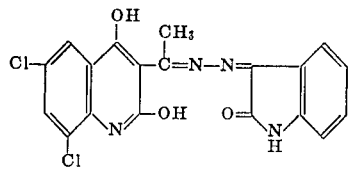

5. A dye having the formula

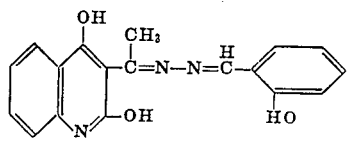

6. A dye having the formula

7. A dye having the formula

* * * * *